Sept. 16, 1969  R. OLLIS, JR., ET AL  3,467,417
FASTENER UNIT
Filed Nov. 9, 1966
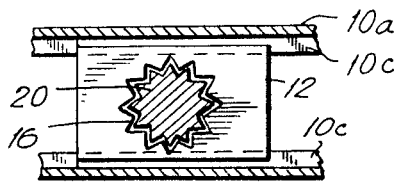
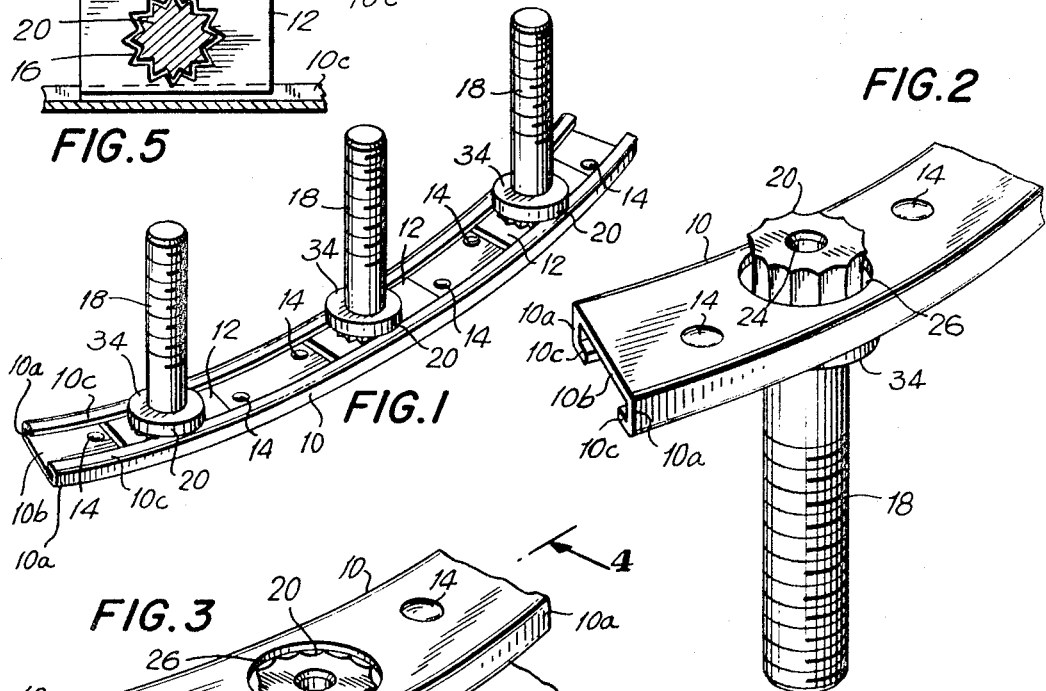
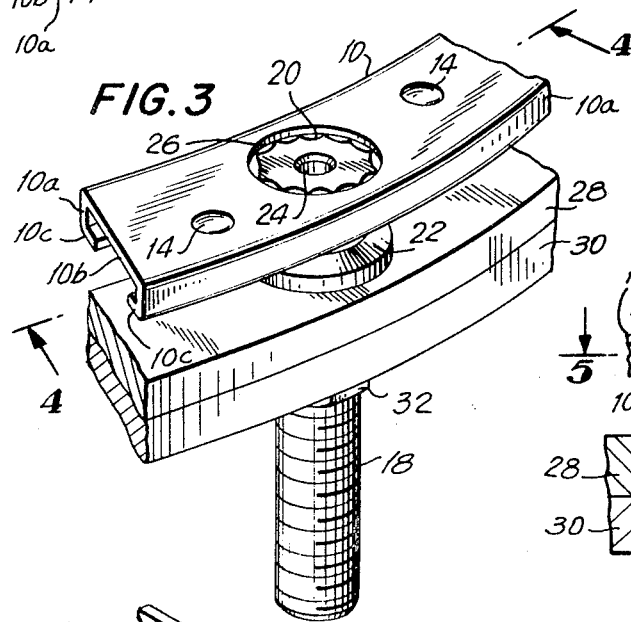
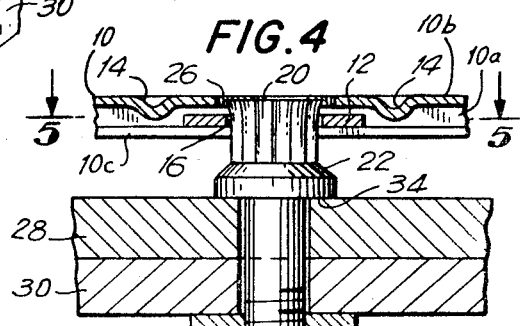
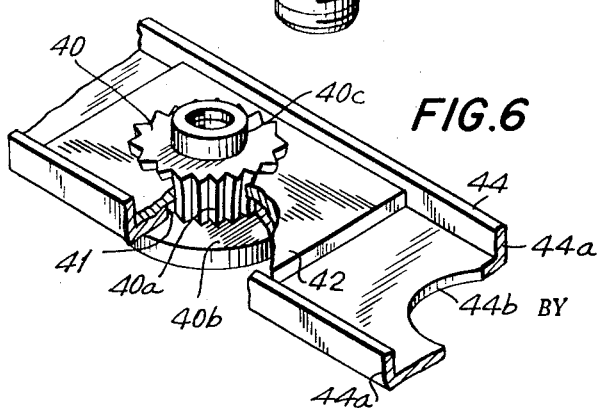
INVENTORS.
RAYMOND OLLIS, Jr.
ROGER B. WHITESIDE
BY Curtis, Morris & Safford
ATTORNEYS

United States Patent Office 3,467,417
Patented Sept. 16, 1969

3,467,417
FASTENER UNIT
Raymond Ollis, Jr., Oreland, Pa., and Roger B. Whiteside, Cinnaminson, N.J., assignors to Standard Pressed Steel Co., Jenkintown, Pa.
Filed Nov. 9, 1966, Ser. No. 593,169
Int. Cl. F16b 39/28, 39/282
U.S. Cl. 287—189.36                                              10 Claims

ABSTRACT OF THE DISCLOSURE

A unit having a fastener retained in a channel strip by a locking plate The fastener is loosely received in an aperture in the locking plate. Movement of the fastener normal to the plane of the locking plate is limited by regions of enlarged width on the fastener on both sides of the locking plate. The locking plate is so positioned within the channel strip and dimensioned that limited rotational movement of the fastener may take place. The unit is arranged so that the bearing surface of the fastener is located outside the boundaries of the channel strip.

---

The present invention relates, in general, to fastening devices and, in particular, to a unit having a floating fastener element which is permitted to undergo slight movements relative to a support component upon which the fastener element is mounted.

It is very difficult in the manufacture and assembly of large structures, such as airplane frames, to achieve exact alignment between mating fastener elements. In order to overcome this difficulty, floating fasteners are employed to accommodate slight misalignments between complementary fastener elements which are within prescribed tolerances.

It is an object of the present invention to provide a new and improved fastening device having one or more floating fastener elements.

It is another object of the present invention to provide such a fastening device in which the fastener elements may be either nuts or bolts.

It is a further object of the present invention to provide a fastener unit which is relatively simple in construction, inexpensive to fabricate and highly reliable in operation.

These objects, as well as others, are achieved according to the present invention by inserting one or more fastener elements individually into apertures in a corresponding number of locking plates. The fasteners and the apertures in the locking plates are shaped and dimensioned to result in a loose fit, whereby the fasteners may undergo limited movement through the apertures in a direction normal to the plane of the locking plates but are permitted to undergo only limited rotational movement within the apertures relative to the locking plates. The movement of each fastener normal to the plane of its associated locking plate is limited by a pair of regions of enlarged width spaced axially on the fastener with one such region located to each side of the locking plate. The locking plates are captivated in a channel strip in one of two ways. In one embodiment of the invention, the channel strip has a pair of side flanges joined together by a web, with inturned edges extending toward each other from the side flanges. The web is dimpled adjacent each edge of the locking plate to limit the longitudinal movements of the locking plates. The side flanges of the channel strip limit transverse movements of the locking plates, while the web and the inturned edges of the channel strip determine the extent of movement of the locking plates in a direction normal to the plane of the web. In a second embodiment of the invention, the fastener structure captivates the locking plates in the channel strip. One of the regions of enlarged width is located outside the channel strip and bears against the outer surface of the web, while the second region of enlarged width is located inside the channel strip and bears against the surface of the locking plate opposite from the surface facing the web. In both embodiments of the invention, each locking plate has at least one dimension which is greater than the distance between the side flanges of the channel strip so as to limit the rotational movement of the locking plates within the channel strip as a mating fastener element engages the fastener element mounted on the channel strip. The fasteners are arranged so that the bearing surfaces are outside the boundaries of the channel strip so that the fasteners may bear directly against a workpiece or structural member to which the fasteners are secured.

For a better understanding of the present invention, together with other and further objects thereof, reference is made to the following description, taken in connection with the accompanying drawing, and its scope will be pointed out in the appended claims.

Referring to the drawing:
FIGURE 1 is a perspective view of a portion of a fastener strip constructed in accordance with the present invention in which bolts are employed as the fastener elements;

FIGURE 2 is an enlarged perspective view of a portion of the fastener strip of FIGURE 1 inverted from its position in FIGURE 1;

FIGURE 3 is a perspective view, at the scale of FIGURE 2, which illustrates the manner in which a fastener strip constructed in accordance with the present invention is employed in fastening two members together;

FIGURE 4 is a sectional view taken along line 4—4 of FIGURE 3;

FIGURE 5 is a horizontal section taken along line 5—5 of FIGURE 4; and

FIGURE 6 is a perspective view of a portion of another fastener strip constructed in accordance with the present invention in which nuts are employed as the fastener elements.

The fastener strip illustrated in FIGURES 1 and 2 includes a channel strip 10 having a pair of side flanges 10a joined together by a web 10b. A pair of inturned edge portions 10c extend toward each other from the side flanges 10a.

A plurality of locking plates 12 is positioned within the channel strip 10 at prescribed points along its length. Each locking plate 12 is rectangular in shape and has at least one dimension which is greater than the distance between the side flanges 10a of the channel strip 10. This limits the rotational movements of the locking plates 12 within the channel strip 10. Both dimensions of the locking plates 12, however, are greater than the distance between the inturned edge portions 10c of the channel strip 10 to prevent the locking plates from passing between the inturned edges at any angle of rotation or tilt of the locking plates. The width of the locking plates 12 determines the amount of transverse movement of the locking plates within the channel strip 10, while both dimensions of the locking plates determine the amount of rotation which may take place prior to the abutting of two diagonally opposed corners of the locking plates against the side flanges of the channel strip. The distance between the web 10b and the inturned edge portions 10c determines the extent of movement of the locking plates normal to the plane of the web.

Longitudinal movement of the locking plates 12 within the channel strip 10 is limited by pairs of dimples 14 in the web 10b. As illustrated, one dimple is provided a short distance beyond each transverse edge of the locking plates. The pairs of dimples are spaced according to the desired locations of the locking plates, with the spacing between the dimples of any pair being determined by the desired extent of longitudinal movement of the locking plates.

Each locking plate 12 is provided with an aperture 16 for loosely receiving a fastener, such as one of the bolts 18. The apertures 16 are shaped and dimensioned to permit movement of the bolts 18 through the apertures normal to the plane of the locking plates. However, only limited rotational movements of the bolts 18 within the apertures 16, relative to the locking plates 12, is possible. As most clearly illustrated in FIGURE 5, the apertures 16, for example, are twelve-point stellate holes which loosely receive twelve-point stellate heads 20 on the bolts 18.

Each bolt head 20 is provided with a region of enlarged diameter on both sides of the locking plates 12 which has a diameter greater than that of twelve-point holes 16. One of these regions of enlarged diameter is a tapered shoulder 22 at one end of bolt head 20, most clearly illustrated in FIGURES 3 and 4, while the second region of enlarged diameter is the swelled or staked outer end portion of the bolt head formed by a suitable power tool received in a lightening hole 24 at the center of the bolt head. The swelled end of the bolt head 20 is illustrated most clearly in FIGURES 2 and 4. The axial spacing of the two regions of enlarged width determines the extent of movement of the bolts 18 through the twelve-point holes 16 in a direction normal to the plane of the locking plates. In particular, for the orientation of the fastener strip as illustrated in FIGURE 1, downward movement of the bolts 18 is limited by abutment of the tapered shoulders 22 against the inturned edges 10c of the channel strip. Upward movement of the bolts 18 is limited by engagement of the swelled portions of the bolt heads 20 with the edges of the twelve-point holes 16 on the lower surfaces of the locking plates 12. It should be noted that the diameter of the tapered shoulders 22 may be less than the distance between the inturned edges 10c, in which case the downward movements of the bolts 18 are limited by the tapered shoulders 22 bearing against the edges of the twelve-point holes 16 on the upper surfaces of the locking plates 12.

The fastener strip illustrated in FIGURES 1 and 2 is assembled in the following manner. The twelve-point head 20 of the bolt 18 is inserted into the twelve-point hole 16 of the locking plate 12. The bolt 18 is captivated by swelling the end of the bolt head 20 to a dimension greater than the twelve-point hole 16. Next, the locking plates 12, along with the captivated bolts 18, are introduced into the channel strip 10 by sliding the locking plates between the web 10b and the inturned edges 10c. Finally, after the locking plates 12 are located at the desired positions along the length of the channel strip 10, the dimples 14 are pressed into the web 10b adjacent the transverse edges of the locking plates at the desired locations to captivate the locking plates within the channel strip.

The bolts 18, so mounted, have limited longitudinal and transverse movement along the surface of the web 10b, as well as limited movement in a direction normal to the plane of the locking plates. The movements of the bolts 18 in a direction normal to the plane of the locking plates are limited to the two regions of enlarged width on the heads of the bolts, as well as the web 10b and the inturned edges 10c between which the locking plates may move. In addition, the bolts 18 may undergo slight rotational movements within the twelve-point holes 16 in the locking plates as well as slight rotational movements with the locking plates which are limited by diagonally opposed corners of the locking plates abutting against the side flanges 10a of the channel strip. In order to provide additional freedom of movement for the bolts 18 in a direction normal to the plane of the web 10b, clearance holes 26 may be provided in the web at the positions of the bolts 18 through which the bolt heads 20 may project as illustrated in FIGURE 2. The actual extent of movement of the bolts 18 through clearance holes 26 is dependent upon the height of the side flanges 10a and the axial spacing of the regions of enlarged width on the bolt head 20.

FIGURES 3 and 4 illustrate a fastener strip constructed in accordance with the present invention securing together two members 28 and 30. The shank and the threaded portion of a bolt 18 are passed through aligned holes in the two members 28 and 30. Next, a nut 32 is turned onto the bolt 18 until the nut bears up against the bottom surface of member 30. As the nut 32 is tightened onto bolt 18, the bolt undergoes a slight rotational movement until the twelve points on the head 20 bear against the twelve-point surfaces of the hole 16. Then the bolt 18, together with its associated locking plate 12, undergoes an additional slight rotational movement until two diagonally opposed corners of the locking plate abut against the side flanges 10a. The bolt 18 then is drawn downward until the nut 32 is tightened firmly onto the bolt. In a preferred form of the present invention, the various components which determine the extent of movement of the bolts 18 normal to the plane of the locking plates 12 are dimensioned so that the bolts arrive at some point intermediate their extreme points of movement when the nut 32 is tightened onto the bolt. This results in no bearing forces being applied against either the locking plates or the channel strip by the bolts. In this connection, it should be noted that the bottom surface 34 of the shoulder of the bolt head 20 bears against member 28 rather than the inturned edges 10c of the channel strip 10 bearing against member 28. This is a particularly advantageous feature of the present invention since the bolt head 20 normally is fabricated from a harder material than is the channel strip 10. The only force or bearing to which the channel strip 10 is subjected is the anti-rotational force on the inside surfaces of the side flanges 10a caused by the corners of the locking plates abutting against the side flanges.

FIGURE 6 is a perspective view of a portion of another fastener strip constructed in accordance with the present invention in which a nut 40 is employed as the fastener element. The nut 40 has a body portion 40a having a twelve-point stellate cross-sectional shape and a shoulder portion 40b. Both portions 40a and 40b surround an internally threaded portion 40c. The twelve-point body portion 40a is passed through a clearance hole 41 in the web 44b of a channel strip 44 and is received loosely in a twelve-point hole, in alignment with clearance hole 41, in a locking plate 42. The twelve-point hole in the locking plate 42 is shaped and dimensioned to permit movement of the nut 40 normal to the plane of the locking plate as well as limited rotational movement within the twelve-point hole. The locking plate 42, in turn, is located in the channel strip 44 and has at least one dimension which is greater than the distance between the side flanges 44a of the channel strip.

The shoulder 40b serves as a first region of enlarged width which is dimensioned to be greater than the clearance hole 41, while the opposite end of the body portion 40a is swelled or staked to serve as a second region of enlarged width which is dimensioned to be greater than the twelve-point hole in the locking plate 42. These two regions of enlarged width limit the movements of the nut 40 normal to the plane of the locking plate 42.

The fastener unit of FIGURE 6 is assembled in the following manner. The locking plate 42 is positioned in the channel strip 44 so that the twelve-point hole in the locking plate is aligned with the clearance hole 41 in the web 44b. Then the internally threaded portion 40c and the body portion 40a of the twelve-point nut 40 are passed through the clearance hole 41 into the twelve-point hole in the locking plate. The upper end of the body portion 40a then is swelled, thereby captivating the nut 40 and the locking plate 42.

In contrast to the arrangement of the fastener strip in FIGURES 1 through 4, in the fastener strip in FIGURE 6 the shoulder portion 40b bears against the outer surface of the web 44b of the channel strip 44 to limit the movement of the nut 40 in one direction normal to the plane of the locking plate 42, while the swelled portion of the nut bears against the surface of the locking plate opposite from the surface facing the web to limit the movement of the nut in an opposite direction. In this embodiment of the invention, the clearance hole 41 in the web 44b limits longitudinal and transverse movements of the nut within the channel strip so that no limit means, such as the dimples 14, need be provided in the web. Furthermore, because the shoulder 40b is on one side of the web 44b and the locking plate 42 is between the web and the swelled portion of the nut, the channel strip 44 need not be provided with any inturned edge portions to captivate the locking plate. Because of the loose fit between the nut 40 and the twelve-point hole in the locking plate 42, the nut may undergo slight rotational movements within the twelve-point hole as well as slight rotational movements with the locking plate until two diagonally opposed corners of the locking plate abut against the inside surfaces of the side flanges 44a.

While there have been described what are at present considered to be the preferred embodiments of this invention it will be obvious to those skilled in the art that various changes and modifications may be made therein without departing from the invention and it is, therefore, aimed to cover all such changes and modifications as fall within the true spirit and scope of the invention.

We claim:

1. In a joint, the combination comprising:
   a plurality of members positioned adjacent one another having aligned holes forming a passage from an outside surface of a first of said members to an outside surface of a second of said members;
   a channel strip spaced from said outside surface of said first member and having a pair of side flanges joined together by a web;
   a locking plate positioned within said channel strip and having at least one transverse dimension which is greater than the distance between said side flanges, whereby the rotational movement of said locking plate is limited by said side flanges, said locking plate having an aperture substantially aligned with said passage through said members, said aperture in said locking plate shaped and dimensioned to permit movement of the head of a bolt through said aperture normal to the plane of said locking plate and limited rotational movement of said bolt within said aperture relative to said locking plate;
   a bolt loosely retained in said aperture in said locking plate and having on said head a first region of enlarged width on one side of said locking plate and a second region of enlarged width on the opposite side of said locking plate, whereby movements of said bolt through said aperture normal to the plane of said locking plate are limited, said bolt head having an underside bearing surface located outside the boundaries of said channel strip and bearing directly against said outside surface of said first member, said bolt also having a shank extending from said bolt head through said passage through said members with a threaded portion projecting beyond said outside surface of said second member;
   and a nut turned onto said threaded portion of said bolt and bearing against said outside surface of said second member.

2. The combination of claim 1 wherein one of said regions of enlarged width on said bolt head is a shoulder forming said underside bearing surface.

3. In a joint, the combination comprising:
   a plurality of members positioned adjacent one another having aligned holes forming a passage from an outside surface of a first of said members to an outside surface of a second of said members;
   a channel strip spaced from said outside surface of said first member and having a pair of side flanges joined together by a web and a pair of inturned edges extending toward each other from said side flanges;
   a locking plate positioned within said channel strip and having at least one transverse dimension which is greater than the distance between said side flanges, whereby the rotational movement of said locking plate is limited by said side flanges, said web and said inturned edges of said channel strip limiting the movement of said locking plate normal to the plane of said web, said locking plate having an aperture substantially aligned with said passage through said members, said aperture in said locking plate shaped and dimensioned to permit movement of the head of a bolt through said aperture normal to the plane of said locking plate and limited rotational movement of said bolt within said aperture relative to said locking plate;
   a bolt loosely retained in said aperture in said locking plate and having on said head a first region of enlarged width on one side of said locking plate and a second region of enlarged width on the opposite side of said locking plate, whereby movements of said bolt through said aperture normal to the plane of said locking plate are limited, said bolt head having an underside bearing surface projecting beyond the plane defined by said inturned edges, said bolt also having a shank extending from said bolt head through said passage through said members with a threaded portion projecting beyond said outside surface of said second member;
   means within said channel strip for limiting the longitudinal movement of said locking plate within said channel strip;
   and a nut turned onto said threaded portion of said bolt and bearing against said outside surface of said second member.

4. The combination of claim 3 wherein said web has a clearance hole through which said bolt head may project.

5. The combination of claim 3 wherein said bolt head has a stellate wrenching surface and said aperture in said locking plate is a stellate hole.

6. The combination of claim 3 wherein said locking plate is rectangular and said web has dimples adjacent the transverse edges of said locking plate to limit said longitudinal movements of said locking plate within said channel strip.

7. In a joint, the combination comprising:
   a plurality of members positioned adjacent one another having aligned holes forming a passage from an outside surface of a first of said members to an outside surface of a second of said members;
   a channel strip spaced from said outside surface of said first member and having a pair of side flanges joined together by a web;
   a locking plate positioned within said channel strip and having at least one transverse dimension which is greater than the distance between said side flanges, whereby the rotational movement of said locking plate is limited by said side flanges, said locking plate having an aperture substantially aligned with said passage through said members, said aperture in said locking plate shaped and dimensioned to permit movement of a nut element through said aperture normal to the plane of said locking plate and limited rotational movement of said nut element within said aperture relative to said locking plate;
   a nut element loosely retained in said aperture in said locking plate and having a first region of enlarged width on one side of said locking plate and a second region of enlarged width on the opposite side of said locking plate, whereby movements of said nut element through said aperture normal to the plane of said locking plate are limited, said nut element having a bearing surface located outside the boundaries of said channel strip and bearing directly against said outside surface of said first member;

and a bolt having an underside bearing surface on the head thereof bearing directly against said outside surface of said second member and a shank extending from said head through said passage through said members with a threaded portion in threaded engagement with said nut element.

8. In a joint, the combination comprising:

a plurality of members positioned adjacent one another having aligned holes forming a passage from an outside surface of a first of said members to an outside surface of a second of said members;

a channel strip spaced from said outside surface of said first member and having a pair of side flanges joined together by a web, said web having an aperture substantially aligned with said passage through said members;

a locking plate positioned within said channel strip and having at least one transverse dimension which is greater than the distance between said side flanges, whereby the rotational movement of said locking plate is limited by said side flanges, said locking plate having an aperture substantially aligned with said passage through said members, said aperture in said locking plate shaped and dimensioned to permit movement of a nut element through said aperture in said locking plate normal to the plane of said locking plate and limited rotational movement of said nut element within said aperture in said locking plate relative to said locking plate;

a nut element loosely retained in said aperture in said locking plate and said aperture in said web and having a first region of enlarged width outside the outer surface of said web to limit said movement of said nut element in one direction normal to the plane of said locking plate and a second region of enlarged width beyond the surface of said locking plate opposite from the surface of said locking plate facing said web to limit said movement of said nut element in an opposite direction normal to the plane of said locking plate, said nut element having a bearing surface located outside the boundaries of said channel strip and bearing directly against said outside surface of said first member;

and a bolt having an underside bearing surface on the head thereof bearing directly against said outside surface of said second member and a shank extending from said head through said passage through said members with a threaded portion in threaded engagement with said nut element.

9. The combination of claim 8 wherein said nut element has a stellate wrenching surface and said aperture in said locking plate is a stellate hole.

10. The combination of claim 9 wherein said locking plate is rectangular.

References Cited

UNITED STATES PATENTS

| | | | |
|---|---|---|---|
| 2,144,350 | 1/1939 | Swanstrom | 151—41.76 |
| 2,249,923 | 7/1941 | Whitcombe | 151—41.76 |
| 2,575,594 | 11/1951 | Reiner | 151—41.76 |
| 2,455,145 | 11/1948 | Swanstrom | 151—41.76 |

FOREIGN PATENTS

| | | |
|---|---|---|
| 459,349 | 1/1937 | Great Britain. |
| 678,395 | 9/1952 | Great Britain. |

EDWARD C. ALLEN, Primary Examiner

U.S. Cl. X.R.

151—41.71, 41.76